Dec. 15, 1931.  B. A. CRENSHAW  1,836,705
SIGNALING DEVICE
Filed Sept. 15, 1930   3 Sheets-Sheet 1
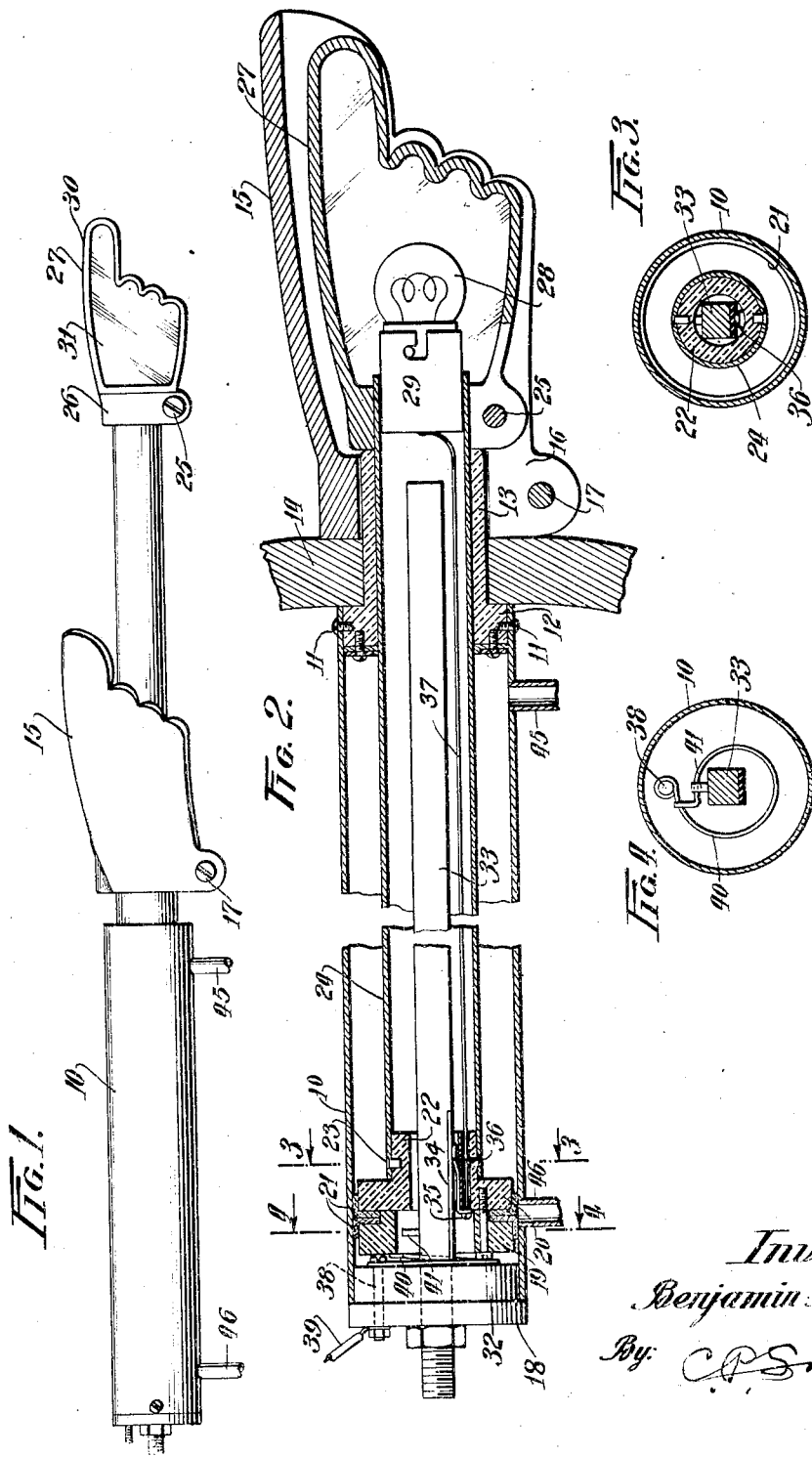
Inventor:
Benjamin A. Crenshaw,
By: C. P. Soper
Att'y.

Dec. 15, 1931.    B. A. CRENSHAW    1,836,705
SIGNALING DEVICE
Filed Sept. 15, 1930    3 Sheets-Sheet 2
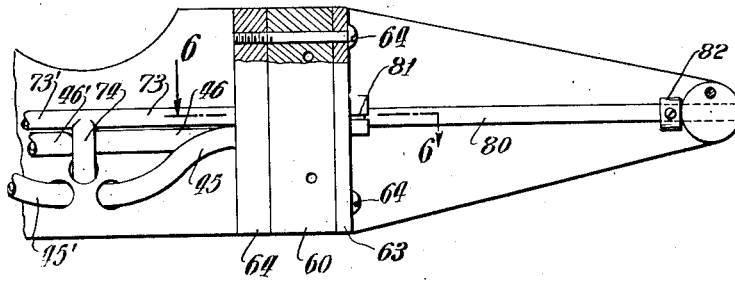
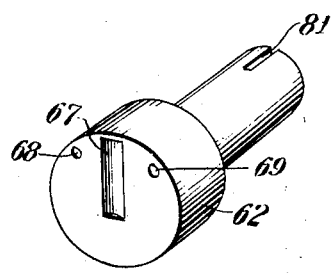
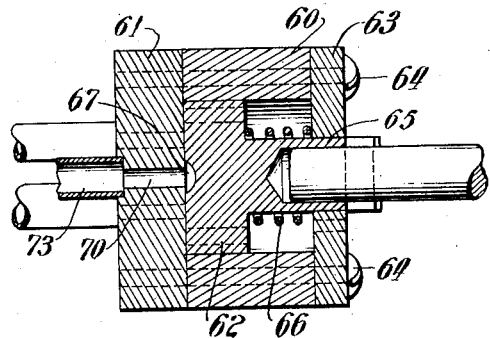
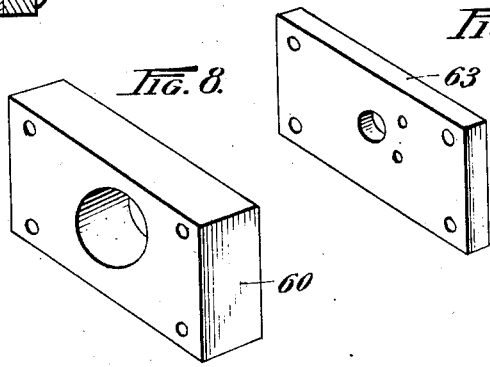
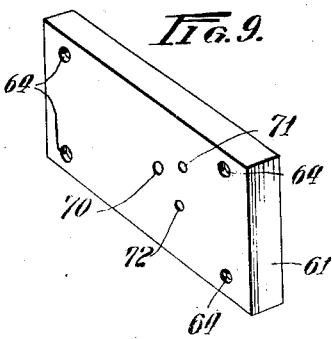
Inventor:
Benjamin A. Crenshaw
By: C. P. Soper
Att'y.

Dec. 15, 1931.   B. A. CRENSHAW   1,836,705
SIGNALING DEVICE
Filed Sept. 15, 1930    3 Sheets-Sheet 3

Inventor:
Benjamin A. Crenshaw
By: C. P. Soper
Atty.

Patented Dec. 15, 1931

1,836,705

UNITED STATES PATENT OFFICE

BENJAMIN A. CRENSHAW, OF CHICAGO, ILLINOIS

SIGNALING DEVICE

Application filed September 15, 1930. Serial No. 481,821.

This invention relates to signaling devices of the character commonly used on motor vehicles to indicate to observers, either in adjacent vehicles or pedestrians, the intended operation or movement of the vehicle on which the signal is mounted.

The present invention comprises a plurality of signals and lights so arranged that they may be observed readily from either in front of the car or the rear thereof, both in the day or at night.

An object of the invention is the provision of a signaling device which is capable of observation from both the front and rear of a car, and which may be actuated by power under direction of a control button or lever so positioned as to be easily actuated by the driver of the car.

One of the features of the invention resides in the provision of a pneumatically actuated plunger, receiving power directly from the engine of the vehicle, for operating the signal both to render it operative or to restore it to its normal position.

Another feature of the invention is the arrangement of means whereby the signal lamp is lighted as soon as it leaves its normal position so that the illuminated, laterally moving signal is provided. This renders the signal observable sooner, and its moving character renders it more conspicuous and therefore more quickly seen.

In general, the signaling device is in the form of a hand with the index finger extended. The central portion of the hand and finger is cut away and a signal light therein operates to illuminate the hand and render it plainly visible at night. Colored glass or lenses may be provided on opposite sides of the light and overlying the cut away portion so that the signal will appear red when viewed from the rear and preferably green when seen from in front. This expedient will readily disclose to an observer, on a dark night, whether the car bearing the signal is approaching or going in the opposite direction.

In practice, a pair of such signaling hands will be provided, one adapted to be projected from each side of the car, preferably adjacent to the wind shield. When the car is to make a right turn, the right signaling hand will be extended, and when it is about to make a left turn, the left one will be extended.

The present invention provides means for actuating the signaling means through the instrumentality of the suction created in the intake manifold of the engine. A valve, controlled by a conveniently placed lever, operates to connect the vacuum to one side or the other of the operating piston to move the signal in or out, as desired. In the present embodiment of the invention, two valves and two control levers therefor are provided, but one four-way valve and operating means or other control medium could readily be substituted.

It is believed the further disclosure of the invention will be understood most readily from a detailed description thereof taken in connection with the accompanying drawings, in which Fig. 1 is a view of one of the signaling devices detached with the signal arm extended;

Fig. 2 is an enlarged vertical section of the signal showing the signal arm retracted;

Fig. 3 is a section substantially on the line 3—3 of Fig. 2;

Fig. 4 is a section substantially on the line 4—4 of Fig. 2, but with the plunger moved from normal position;

Fig. 5 is an elevation of one of the valve mechanisms;

Fig. 6 is a section substantially on the line 6—6 of Fig. 5;

Fig. 7 shows the movable or rotatable part of the valve;

Fig. 8 is a perspective view of bearing for the valve member of Fig. 7;

Fig. 9 shows the stationary valve member which cooperates with the member of Fig. 7;

Fig. 10 shows the cover plate for the housing or bearing of Fig. 8;

Figure 12:
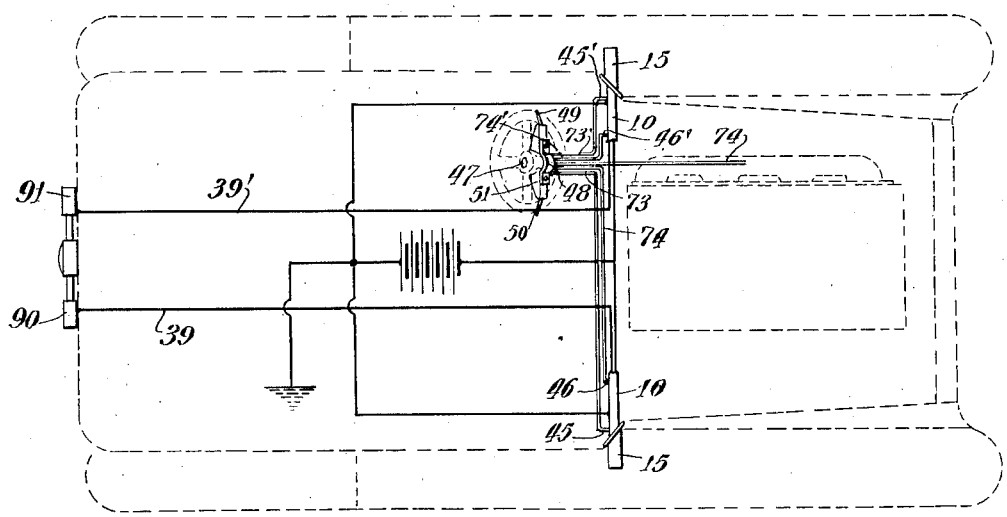
Fig. 12 is a diagrammatic representation of the manner of connecting the vacuum tube and the electrical conductors.

Referring now to the drawings, in which like reference characters indicate the same parts in the several views, 10 indicates a cylindrical member secured in any desired manner under the cowl of the automobile with one end adjacent to the side covering of the car adjacent to the lower corner of the windshield. Secured within one end of tube 10, as by screws 11, is the tubular member 12 which has the reduced portion 13 extending through the side plate 14 of the car, as indicated in Fig. 2. Secured to the outer end of the reduced portion 13, in any desired manner, is the signal housing 15. In the present disclosure, housing 15 is secured to part 13 by means of clamping ring 16 and screw 17. The opposite end of cylinder 10 is closed by a block 18 secured in place in any desired manner.

Slidable within the cylinder 10 is the piston, the two parts of which are indicated at 19 and 20 in Fig. 2. Between parts 19 and 20 are the valve washers or leathers 21, the whole being secured together by screws or in any other desired manner. The piston member 20 is provided with a reduced portion 22 about which is secured, as by the screws 23 one end of the tubular signal arm 24. Secured about the opposite end of the arm 24, by the screw 25, is the clamping ring 26 at one end of the signal member 27. As previously described, the signal member 27 is in the form of a hand with the index finger extended, the central portion being cut away to receive the light or bulb 28. Secured within the outer end of the tube 24 is the lamp socket 29 within which the base of bulb 28 is positioned. Secured to one side of the signal 27, as by the clamping ring 30, is the colored lens 31. The opposite side of the signal will be provided with a similar lens but preferably of a different color, as previously described.

Secured within the cylinder 10, in any desired manner, is a block 32 of insulating material. Fixed substantially centrally of block 32 is a generally square rod 33 of conducting material which extends beyond the opposite end of cylinder 10, as clearly shown in Fig. 2. Set into one side of bar 33 is a strip 34 of bakelite or other insulating material. Secured to the piston block 20, as by the screw 35, is a brush or wiper 36 which rests on the insulating strip 34 when the signal arm 24 is in its normal or retracted position. However, when the signal arm 24 moves from normal, wiper 36 moves off of strip 34 and slides over the flat side of bar 33. A conductor 37 joins brush 36 to one terminal of the lamp socket 29. The other terminal of the lamp socket may be "grounded" to the frame of the car, as through the arm 24. The bar 33 will be joined to the live pole of grounded battery in any desired manner. Thus, it will be seen that as soon as signal arm 24 leaves normal, lamp 28 will be lighted and will remain lighted until the plunger 24 returns to its normal position.

Extending through the block 32 is a bolt 38, to one end of which is secured the spiral or loop spring 40 of conducting material. Extending outwardly from the battery bar 33 is a pin 41. When the signal arm is retracted, the piston block 19 engages spring 40 and forces it back against the block 32. When, however, the signal arm 24 is moved from its retracted position, the spring 40 is released and moves into contact with pin 41, thus connecting battery to conductor 39 which is joined to one terminal of the rear signal, shown in Fig. 12. Thus, as soon as the signal moves from its normal position, the tail light is automatically lighted.

The signal arm is moved outwardly and inwardly by means of a vacuum produced in the cylinder 10, at one end or the other, depending on which direction the signal arm is to be moved. The vacuum is produced by joining the cylinder 10 to the intake manifold of the engine by means which will be presently described. When the tube 45, which communicates with cylinder 10, is joined to the intake, the signal arm is moved outwardly and the bulb 28 is lighted. When, however, tube 46, which also communicates with cylinder 10 but at the opposite end thereof, is joined to the intake, the signal is returned to its normal position and the light extinguished.

Figure 11:
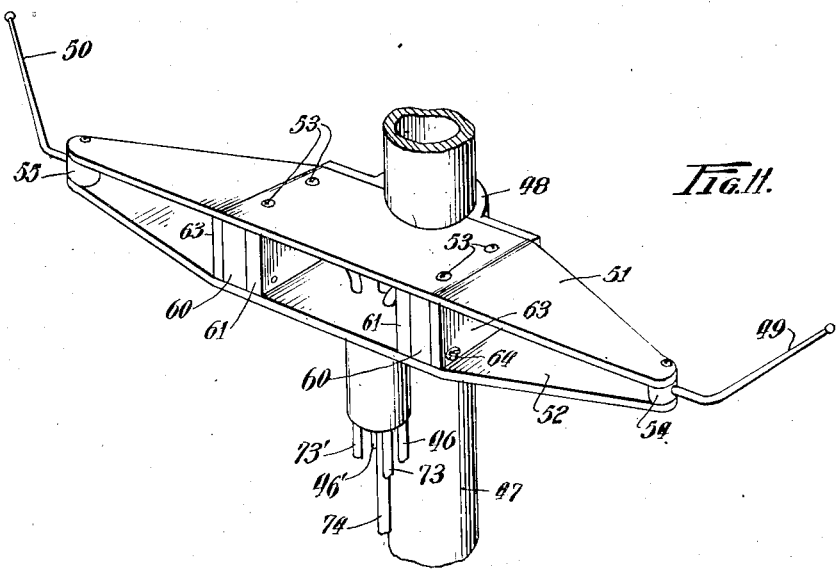
Fig. 11 is a perspective view of the valve assembly complete.

The valve which controls the signal will now be described. The complete valve assembly and control levers are shown in Fig. 11. The assembly will preferably be secured to the steering post 47, as by the clamping plate 48. The valve and valve operating lever 49 for controlling the right signal is at the right of the steering post, and the valve and lever 50 for the left signal is at the left of the post 47. The valves are positioned between the frame plates 51 and 52 by the screws 53. Between the plates 51 and 52, at the opposite ends thereof, are the blocks 54 and 55, respectively. It will be noted that the levers 49 and 50 pass through openings in the blocks 54 and 55, respectively, for a purpose which will presently appear.

Referring now to Fig. 6, the valve comprises the movable valve member housing 60, the stationary valve member 61, the rotatable valve member 62 within housing 60, and the cover plate 63. The parts 60, 61 and 63 are secured together by means of screws 64. The cover plate 63 is provided with an opening through which extends the reduced portion 65 of the movable valve member 62. A coil spring 66 surrounds the reduced portion 65 and acts to maintain the face of valve member 62 snugly in engagement with stationary valve member 61.

The valve member 62 is provided in the face thereof with a groove 67 and a pair of holes 68 and 69 extend entirely through the valve member. It will be noted that the groove 67 overlies the center of the block 62. The stationary valve member is provided with three holes 70, 71 and 72. A tube 73 connects valve opening 70 to the intake manifold of the engine (see Fig. 5) through the medium of tube 74 which is common to both the right and left tubes 73. Opening 71 (Fig. 9) is joined to inner end of cylinder 10 by tube 46 (Figs. 2, 5 and 6), while tube 45 joins opening 72 to the outer end of cylinder 10. Reference characters 45', 46' and 73' in Fig. 5 indicate corresponding tubes associated with the left valve.

From an inspection of Fig. 6, it will be noted that the groove 67 in block 62 overlies the opening 70 in member 61 which is connected to the intake by tube 73. When block 62 is rotated in a clockwise direction, when viewed from the right in Fig. 6, to one of its operative positions, the outer end of groove 67 overlies opening 71 joined to the inner end of cylinder 10 by tube 46, and the piston 20 and signal arm 24 carried thereby are urged inwardly by the suction or vacuum created in cylinder 10. When, however, block 62 is rotated in the reverse direction to its other operative position, the outer end of groove 67 overlies opening 72 which is joined to the outer end of cylinder 10 by tube 45, and the piston 20 and signal arm 24 are moved outwardly.

The valve block 62 is operated through the medium of lever 49 which has an angularly disposed portion 80 rotatably extending through block 54 (see Fig. 11). The flattened inner end of part 80 is received by the slot or kerf 81 formed in the end of the reduced portion 65 of block 62. A collar 82, secured to part 80 by a screw, prevents withdrawal of the flattened end of part 80 from kerf 81. Means (not shown) are provided to limit the movement of levers 49 and 50 and the valve members operated thereby so that when moved in one direction groove 67 will be caused to overlie opening 71 to move the signal inwardly, and when moved in the other direction will overlie opening 72 to move the signal outwardly.

It is to be understood that the valve and operating means therefor at the left will be substantially a duplicate of that described, and a description thereof is therefore unnecessary.

In Fig. 12, which diagrammatically illustrates an automobile with applicant's signal means thereon, the general arrangement of the parts is indicated. Litttle description of the parts shown in this figure is needed, as the various parts are indicated by reference characters. It should be noted, however, that the rear of the car is provided with a pair of signals 90 and 91 which are in the nature of illuminated pointing hands like those above described. Reference to this figure will show that the conductor 39, which is joined to contact spring 40 (Fig. 2) leads to the signal 90 at the rear. Thus, it should be understood that whenever one of the forward direction signals is operated, a corresponding rear signal 90 or 91 is illuminated to give a double signal that the car is about to turn one way or the other.

Thus it will be seen that the present invention provides a direction signal which can be observed from either front or rear and which can be actuated by a mere touch of the finger on lever 49 or 50. It also provides a pair of rear direction indicators which are automatically operated simultaneously with the corresponding forward direction indicators.

While in the drawings and in the above description but one embodiment of the invention is disclosed, it is to be understood that many variations in the details of the device are contemplated. The invention, therefore, should be limited only by the scope of the appended claims.

Having thus described my invention, what I claim as new and desire to secure by Letters Patent of the United States is:

1. In a direction signal for vehicles, a tubular member, a hollow signal arm movable in said member and having an insulated portion at one end thereof, a signal bulb at the other end of said arm, means for moving said signal arm inwardly and outwardly within said tubular member, a bar of conducting material projecting into said signal arm and insulated therefrom, an insulating strip carried by said bar, means joining said bar to a source of current, a wiper carried by the insulated portion of said signal arm and arranged to engage said strip when said piston is in its normal position and slide along said bar when said signal arm is moved to extend said signal bulb to operative position, a conductor joining said wiper to one terminal of said bulb, a direction signal bulb at the rear of the vehicle, means for making contact with said bar including a spring at one end of said tubular member arranged to engage said bar and close a circuit when released but maintained out of engagement with said bar by the insulated portion of said signal arm when in its normal position, and means joining said spring to one terminal of said rear signal bulb.

2. In a direction signal for vehicles, a tubular member, a hollow signal arm movable in said member having an insulated portion at one end thereof, a signal bulb at the other end of said arm, means for moving said signal arm inwardly and outwardly within said tubular member, a bar of conducting material projecting into said signal arm, a pin extending from said bar, an insulating strip carried by said bar, means joining said bar to a source of current, a wiper carried by said signal arm insulated therefrom and arranged to engage said strip when said signal arm is in its normal position and slide along said bar when said signal arm is moved to extend said signal bulb to operative position, a conductor joining said wiper to one terminal of said bulb, a direction signal bulb at the rear of the vehicle, a spiral spring at one end of said tubular member concentric with said bar and arranged to engage said pin when released but maintained out of engagement with said bar by the insulated portion of said signal arm when in its normal position, and means joining said spring to one terminal of said rear signal bulb.

In testimony whereof, I have signed my name to the above application.

BENJAMIN A. CRENSHAW.